US010248332B2

United States Patent
Chen et al.

(10) Patent No.: US 10,248,332 B2
(45) Date of Patent: Apr. 2, 2019

(54) METHOD FOR EXTENDING LIFE EXPECTANCY OF DISKS IN CLOUD-BASED SERVICE SYSTEM AND SYSTEM USING THE SAME

(71) Applicant: ProphetStor Data Services, Inc., Taichung (TW)

(72) Inventors: Wen Shyen Chen, Taichung (TW); Chun Fang Huang, Taichung (TW); Ming Jen Huang, Taichung (TW)

(73) Assignee: ProphetStor Data Services, Inc., Taichung (TW)

( * ) Notice: Subject to any disclaimer, the term of this patent is extended or adjusted under 35 U.S.C. 154(b) by 291 days.

(21) Appl. No.: 15/287,973

(22) Filed: Oct. 7, 2016

(65) Prior Publication Data

US 2018/0101313 A1    Apr. 12, 2018

(51) Int. Cl.
*G06F 3/06*    (2006.01)

(52) U.S. Cl.
CPC ............ *G06F 3/0616* (2013.01); *G06F 3/067* (2013.01); *G06F 3/0631* (2013.01); *G06F 3/0632* (2013.01); *G06F 3/0653* (2013.01); *G06F 3/0688* (2013.01); *G06F 3/0689* (2013.01)

(58) Field of Classification Search
CPC ...... G06F 3/0616; G06F 3/0653; G06F 3/067; G06F 3/0631; G06F 3/0632; G06F 3/0688; G06F 3/0689
See application file for complete search history.

(56) References Cited

U.S. PATENT DOCUMENTS 9,542,296 B1 *    1/2017    Engers ................ G06F 11/3452

OTHER PUBLICATIONS

Sandipan Ganguly, Ashish Consul, Ali Khan, Brian Bussone, Jacqueline Richards, and Alejandro Miguel, A Practical Approach to Hard Disk Failure Prediction in Cloud Platforms, Mar. 29, 2016, IEEE, pp. 108, and 110-114. (Year: 2016).*

* cited by examiner

*Primary Examiner* — Reginald G Bragdon
*Assistant Examiner* — Thanh D Vo
(74) *Attorney, Agent, or Firm* — Jackson IPG PLLC; Demian K. Jackson

(57) ABSTRACT

A system for extending life expectancy of disks in a cloud-based service system and the system using the method are disclosed. The present invention uses LSTM modeling and the k-means clustering algorithms to find out performance limit and target lifespan for a cluster of disks assigned for a specific workload running over the cloud-based service system. The disks can be predicted to have a minimum lifetime and the requirement of the workload can be satisfied. Meanwhile, the minimum lifetime is the longest life the disk can last.

16 Claims, 7 Drawing Sheets

| No. of SSD | Status | Lifespan (Days) | No. of SSD | Status | Lifespan (Days) |
|---|---|---|---|---|---|
| 201 | Good | 151 | 216 | Good | 154 |
| 202 | Good | 123 | 217 | Good | 125 |
| 203 | Good | 241 | 218 | Good | 251 |
| 204 | Good | 210 | 219 | Good | 215 |
| 205 | Good | 121 | 220 | Good | 151 |
| 206 | Good | 70 | 221 | Failed | 32 |
| 207 | Good | 56 | 222 | Failed | 15 |
| 208 | Good | 256 | 223 | Failed | 17 |
| 209 | Good | 81 | 224 | Failed | 5 |
| 210 | Good | 95 | 225 | Failed | 151 |
| 211 | Good | 131 | 226 | Good | 15 |
| 212 | Good | 145 | 227 | Good | 21 |
| 213 | Good | 315 | 228 | Good | 35 |
| 214 | Good | 382 | 229 | Good | 40 |
| 215 | Good | 291 | 230 | Good | 19 |

Fig. 3

| No. of SSD | Status | Lifespan (Days) | Group | IOPS | Normalized Lifespan | Normalized IOPS |
|---|---|---|---|---|---|---|
| 214 | Good | 382 | Higher | 3682 | 1.000 | 0.45 |
| 213 | Good | 315 | High | 2523 | 0.794 | 0.43 |
| 215 | Good | 291 | High | 2931 | 0.721 | 0.43 |
| 208 | Good | 256 | High | 116 | 0.613 | 0.43 |
| 218 | Good | 251 | Mid | 1488 | 0.598 | 0.37 |
| 203 | Good | 241 | Mid | 2658 | 0.567 | 0.37 |
| 219 | Good | 215 | Mid | 1890 | 0.488 | 0.37 |
| 204 | Good | 210 | Mid | 2573 | 0.472 | 0.37 |
| 216 | Good | 154 | Low | 2468 | 0.301 | 0.12 |
| 201 | Good | 151 | Low | 372 | 0.291 | 0.12 |
| 220 | Good | 151 | Low | 2334 | 0.291 | 0.12 |
| 212 | Good | 145 | Low | 2990 | 0.273 | 0.12 |
| 211 | Good | 131 | Low | 872 | 0.230 | 0.12 |
| 217 | Good | 125 | Low | 1702 | 0.212 | 0.12 |
| 202 | Good | 123 | Low | 2023 | 0.206 | 0.12 |
| 205 | Good | 121 | Lower | 338 | 0.199 | 0.29 |
| 210 | Good | 95 | Lower | 2371 | 0.120 | 0.29 |
| 209 | Good | 81 | Lower | 3618 | 0.077 | 0.29 |
| 206 | Good | 70 | Lower | 354 | 0.043 | 0.29 |
| 207 | Good | 56 | Lower | 1611 | 0.000 | 0.29 |

Fig. 4

METHOD FOR EXTENDING LIFE EXPECTANCY OF DISKS IN CLOUD-BASED SERVICE SYSTEM AND SYSTEM USING THE SAME

FIELD OF THE INVENTION

The present invention relates to a method for extending life expectancy of disks and a system using the method. More particularly, the present invention relates to a method for extending life expectancy of disks in a cloud-based service system and a system using the method.

BACKGROUND OF THE INVENTION

A disk in a computer is the main device to store data for operation of applications. No matter what type it is, may be a HDD, a SSD or even a magnetic tape, after been used for a long time, the disk will fail to work. If data backup or archive is not properly carried out before the time of failure, data in the disk will be lost. It may cause disaster as there might be important data to the user as well as the operating system and configuration data of the computer system in the disk. Usually, the disk shows some signs prior to its malfunction. For example, stored data disappears or program fails too often. A user may easily notice the signs and takes action to replace the disk and save the data therein. It is feasible because the computer may have only a few disks and the user can keep observing the disk via the performance of the computer every day.

For the architecture a cloud-based service system runs over, it encounters the same challenge of disks. However, a more complex situation is that the architecture usually includes a huge number of disks for data storage and access. Due to different data stored, one disk may be accessed much often than others. Frequent use is a factor to shorten the lifetime of disks. However, it is very hard to observe physical performance of each disk regularly. Executing data backup often and replacing failed disk should not be the economic way to settle the problem for the administrator of the cloud-based service system. Therefore, some techniques have been disclosed to monitor disks in clusters and predict the lifetime of the disks. For example, a US patent application No. US2016232450 provides a storage device lifetime monitoring system for monitoring lifetimes of storage devices and a storage device lifetime monitoring method thereof. The method has steps to collect operation activity information corresponding to the storage devices, store multiple training data having the operation activity information and corresponding operation lifetime values, construct a storage device lifetime predicting model according to the operation activity information and the corresponding operation lifetime values of the training data, input the operation activity information of the storage devices into the storage device lifetime predicting model to generate a predicted lifetime value corresponding to each of the storage devices, and re-construct the storage device lifetime predicting model according to operation activity information and predicted lifetime value of each storage device. Thus, the lifetime of storage devices can be accurately predicted.

Said patent application uses data (operation activity information) from logs, e.g. system log, application log, or database log, for training and predicting lifetime. Although the data in the logs may not tell the exact condition of a disk, still some hint of the healthy status of the disk can be obtained from the records as there is relation between the abnormal records and the real lifetime of corresponding disk. It is able to effectively using historical data in prediction. If the method can precisely find out the lifetime for all disks as the logs revealed, real lifetime for a specific model should be within a certain range, for example, from 4,000 to 5,000 hours of use, based on the same manufacturing processes and quality requirements. However, in fact, some of the disks of the same model work for a short time, some work for a very long time and a majority of disks can have lifetime in the predicted range. Even similar operation activity information are available for two disks, they might have lifetime far from each other. It means some key factors are missing for analysis.

For the similar logs from two disks with different lifetimes, if we look at the I/O patterns of some performance data, e.g. IOPS (Input/Output Per Second), latency, and throughput, or relative information, e.g. CPU (Central Processing Unit) load or memory usage of the host, it can be found that the two disks run differently and this difference could be the factor causing different lifetime. For example, two disks have similar access and failed records in a year. One had been accessed intensively in three months while the other had been averagely accessed. Therefore, a method for providing more precise life expectancy of disks in a cloud-based service system, furthermore, extending life expectancy of the disks by analyzing the I/O patterns is desired.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

The present invention is to provide a method for extending life expectancy of disks in cloud-based service system and a system uses the method. According to an aspect of the present invention, the method includes the steps of: A. collecting performance data for each disk in a cloud-based service system from historical data; B. filtering out the performance data which come from a failed disk or a disk having lifespan shorter than a default value; C. grouping the disks with corresponding performance data according to lifespan levels; D. normalizing the performance data and lifespan as a unitless performance value and a unitless lifespan value; E. processing LSTM (Long Short Term Memory) modeling algorithm on the unitless performance values of each disk in each group to obtain a predicted trend of the unitless performance values in a period of time in the future for each disk; F. assigning a specific unitless performance value for all disks in each group, respectively, based on the predicted trends of the unitless performance values in the group; G. processing k-means clustering algorithm with input sets to obtain output sets, wherein each input set represents a corresponding disk and comprises one specific unitless performance value and one unitless lifespan value; H. denormalizing each output set to obtain a performance limit and a target lifespan, respectively; and I. setting one performance limit to the disks forming a storage so that each disk having an expected lifetime no shorter than the target lifespan in the period of time in the future. The method may further include a step J after the step I: J. provisioning each storage a workload which has a performance requirement matching or below the performance limit.

According to the present invention, the performance data may be latency, throughput, CPU (Central Processing Unit) load, memory usage, or IOPS (Input/Output Per Second). The unitless performance value is calculated by dividing a first difference between a value of one performance data and the minimum value among all values of the performance data by a second difference between the maximum value and the minimum value among all values of the performance data. The unitless lifespan value is calculated by dividing a third difference between one lifespan and the minimum lifespan among all lifespans by a fourth difference between the maximum lifespan and the minimum lifespan among all lifespans. The disk may be a HDD (Hard Disk Drive) or a SSD (Solid State Disk). The lifespan levels may be evenly distributed over the range between the maximum lifespan and the minimum lifespan among all lifespans. The specific unitless performance value may be obtained by averaging the predicted unitless performance values in the group in the period of time in the future. The historical data may be from system log, application log, database log, or S.M.A.R.T. (Self-Monitoring, Analysis and Reporting Technology) log. The central set in each cluster in step G may be chosen as the output set.

Another aspect of the present invention is to provide for a cloud-based service system. The system includes: a host, for operating workloads and processing data access; a number of disks, connected to the host, for storing data to be accessed from the workloads; and a life expectancy extending module, configured to or installed in the host, for collecting performance data for each disk from historical data; filtering out the performance data which come from a failed disk or a disk having lifespan shorter than a default value; grouping the disks with corresponding performance data according to lifespan levels; normalizing the performance data and lifespan as a unitless performance value and a unitless lifespan value; processing LSTM modeling algorithm on the unitless performance values of each disk in each group to obtain a predicted trend of the unitless performance values in a period of time in the future for each disk; assigning a specific unitless performance value for all disks in each group, respectively, based on the predicted trends of the unitless performance values in the group; processing k-means clustering algorithm with input sets to obtain output sets, wherein each input set represents a corresponding disk and comprises one specific unitless performance value and one unitless lifespan value; denormalizing each output set to obtain a performance limit and a target lifespan, respectively; and setting one performance limit to the disks forming a storage so that each disk having an expected lifetime no shorter than the target lifespan in the period of time in the future. The life expectancy extending module may be further for provisioning each storage a workload which has a performance requirement matching or below the performance limit.

According to the present invention, the performance data may be latency, throughput, CPU load, memory usage, or IOPS. The unitless performance value is calculated by dividing a first difference between a value of one performance data and the minimum value among all values of the performance data by a second difference between the maximum value and the minimum value among all values of the performance data. The unitless lifespan value is calculated by dividing a third difference between one lifespan and the minimum lifespan among all lifespans by a fourth difference between the maximum lifespan and the minimum lifespan among all lifespans. The disk may be a HDD or a SSD. The lifespan levels may be evenly distributed over the range between the maximum lifespan and the minimum lifespan among all lifespans. The specific unitless performance value may be obtained by averaging the predicted unitless performance values in the group in the period of time in the future.

The historical data may be from system log, application log, database log, or S.M.A.R.T. log. The central set in each cluster from the k-means clustering may be chosen as the output set.

The present invention uses LSTM modeling and the k-means clustering algorithm to find out performance limit and target lifespan for a cluster of disks assigned for a specific workload running over the cloud-based service system. The disks can be predicted to have a minimum lifetime and the requirement of the workload can be satisfied. Meanwhile, the minimum lifetime is the longest life the disk can last.

BRIEF DESCRIPTION OF THE DRAWINGS

FIG. 3 is a table showing status of the disks.

FIG. 4 is a table showing the result of grouping.

DETAILED DESCRIPTION OF THE PREFERRED EMBODIMENTS

The present invention will now be described in more detail with reference to the following embodiments.

Figure 1:
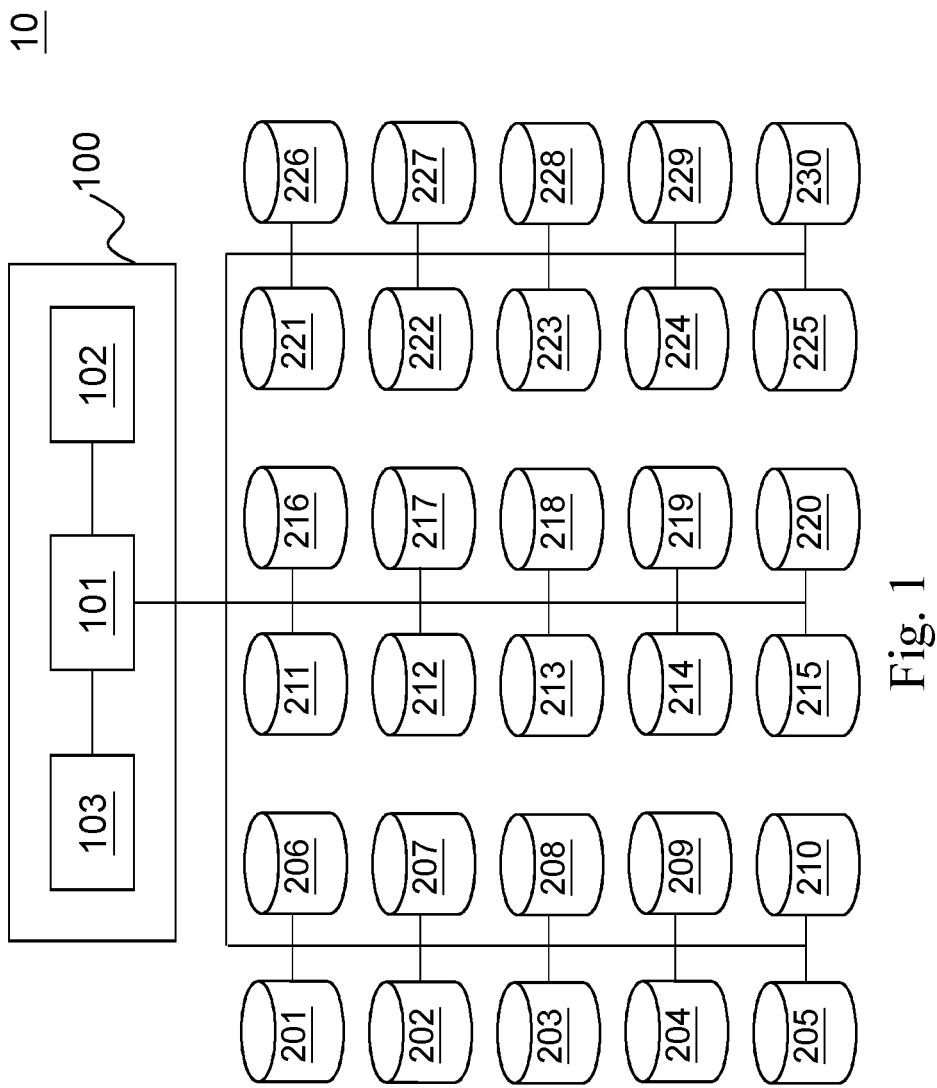
FIG. 1 is a schematic diagram of a cloud-based storage system according to the present invention.

An ideal architecture to implement the present invention is shown in FIG. 1. A cloud-based service system 10 includes a host 100 and 30 disks (the disks are numbered from 201 to 230 in order to have a comprehensive illustration later). The host 100 may be a server. It is used to operate workloads run over and process data access for the workload. The host 100 is the hardware to receive requests from client devices, such as a personal computer, a tablet, and a smartphone or other remote devices via the Internet, LAN (Local Area Network), or WAN (Wide Area Network). The disks 201 to 230 are connected to the host 100, for storing data to be accessed from the workloads. Although the number of disks is 30 in the embodiment, it does not intend to limit the application of the present invention. In fact, the cloud-based service system 10 can have any number of disks as long as it is able to meet the requirements of the workloads. The disk may be a HDD (Hard Disk Drive) or a SSD (Solid State Disk). In the present embodiment, the disks 201 to 230 are all SSD. For the application of the present invention, the type of disks should be identical. Preferably, the model of the disks can be the same (from the same manufacturer and having identical architecture). Thus, a unified comparison can be carried out based on the same condition. A result from the method provided can be more precise.

The host 100 has several key components: a CPU (Central Processing Unit) 101, a memory 102, and a life expectancy extending module 103. The CPU 101 is in charge of the operation of the host 100. The memory 102 may be a SRAM (Static Random Access Memory) or DRAM (Dynamic Random Access Memory). It is used to temporarily store data or program for running the cloud-based service system 10. The life expectancy extending module 103 is the device to implement the method provided by the present invention. It is configured to the host 100. The main functions of the life expectancy extending module 103 are collecting performance data for each disk from historical data, filtering out the performance data which come from a failed disk or a disk having lifespan shorter than a default value, grouping the disks with corresponding performance data according to lifespan levels, normalizing the performance data and lifespan as a unitless performance value and a unitless lifespan value, processing LSTM (Long Short Term Memory) modeling algorithm on the unitless performance values of each disk in each group to obtain a predicted trend of the unitless performance values in a period of time in the future for each disk, assigning a specific unitless performance value for all disks in each group, respectively, based on the predicted trends of the unitless performance values in the group, processing k-means clustering algorithm with input sets to obtain output sets, wherein each input set represents a corresponding disk and comprises one specific unitless performance value and one unitless lifespan value, denormalizing each output set to obtain a performance limit and a target lifespan, respectively, and setting one performance limit to the disks forming a storage so that each disk having an expected lifetime no shorter than the target lifespan in the period of time in the future. In addition, the life expectancy extending module 103 can further provision each storage a workload which has a performance requirement matching or below the performance limit. The functions will be illustrated in detail with the method of the present invention later. It should be noticed that in other embodiment, the life expectancy extending module may be in the form of software and installed in the host 100 (stored in the memory 102 and operated by the CPU 101). In still other embodiment, the life expectancy extending module could be an independent device and configured parallelly to the host 100.

Figure 2:
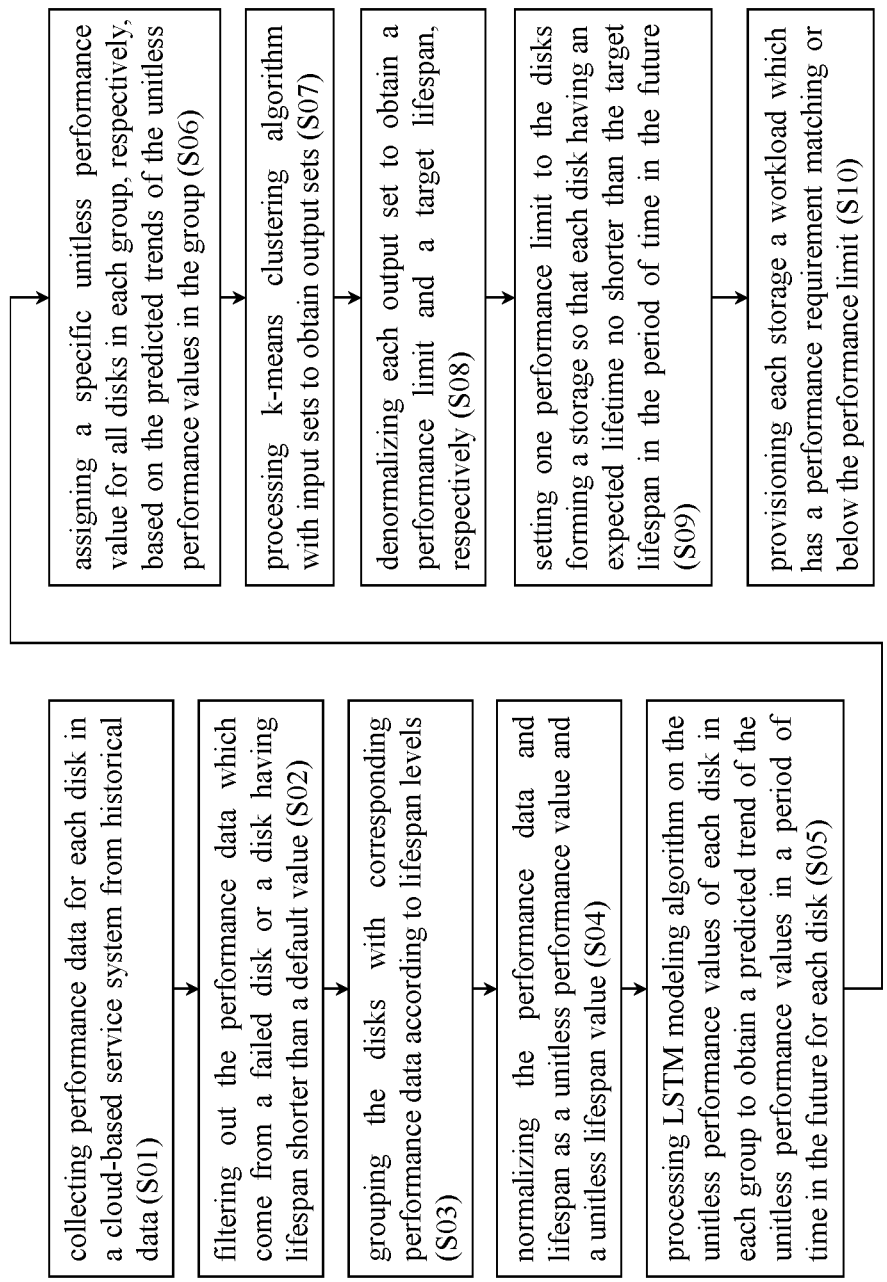
FIG. 2 is a flow chart of a method for extending life expectancy of disks in a cloud-based service system according to the present invention.

Please see FIG. 2. It is a flow chart of the method for extending life expectancy of disks in the cloud-based service system 10 according to the present invention. The first step of the method is collecting performance data for each disk in the cloud-based service system 10 from historical data (S01). Here, the performance data can be collected from any part of the cloud-based service system 10. They may not be necessary to have connections to the physical performance of the disks but related to the performance of a portion of the cloud-based service system 10. For example, the performance data may be latency, throughput, CPU load, memory usage, or IOPS (Input/Output Per Second). Historical data are successively collected data in the past, including the performance data, metadata or other necessary information. They may be from system log, application log, database log, or S.M.A.R.T. (Self-Monitoring, Analysis and Reporting Technology) log. It means to fetch the performance data from the sources above. In this embodiment, IOPS is used for illustration. Moreover, the performance data for one disk can not be interrupted, e.g. successively and periodically recorded performance data in the past 6 months but a week in the third month lost. It is meaningless for an interrupted record of performance data since the I/O pattern of the performance can not be found.

Next, a second step is filtering out the performance data which come from a failed disk or a disk having lifespan shorter than a default value (S02). For a better understanding, please refer to FIG. 3. It is a table showing status of the disks 201 to 230. It is obvious from FIG. 3 that at the moment the analysis is carried out, the status of some of the disks are "failed". A failed disk may be completely dead and waiting for replacement. It can refer to the disk having poor performance, such as dead blocks are over a certain level or easily been overheat. The disks 221 to 225 are judged to be "failed" and can not be used by the present invention. The rest disks are good. However, recorded lifespans for all disks are not the same. Lifespan means the normal operating time (days) of a disk till now. It may keep working longer or may be out of order soon. Lifespan is different from lifetime. The latter is defined as the total time a disk had worked before it was failed. Namely, lifetime is a determined value while lifespan ranges from time to time. In addition to the performance data from the "failed" disks which can not be used, the performance data from the good disks with shorter time to collect performance data (lifespan) are unrepresentative. How short of the lifespan will make the disks unrepresentative is not limited by the present invention. In this embodiment, for the disks with lifespan shorter than 50 days are filtered out. Therefore, disks 226 to 230 are dropped.

A next step is grouping the disks (good and having lifespan longer than 50 days) with corresponding performance data according to lifespan levels (S03). Please see FIG. 4. It is a table showing the result of grouping. Grouping, or binning, is a data pre-processing technique used to reduce the effects of minor observation errors. The number of groups is not restricted. In this embodiment, the number of groups is 5. They are categorized as higher, high, mid, low, and lower. In other embodiment, the number of groups may be 3 and they may be high, mid, and low. The lifespan level is the boundary between two adjacent groups. Preferably, the lifespan levels are evenly distributed over the range between the maximum lifespan and the minimum lifespan among all lifespans. Here, the lifespan levels are set 122, 187, 252, and 317 (days). Thus, from FIG. 4, disk 214 is in the higher group, disks 213, 215 and 208 are in the high group, disks 218, 203, 219, and 204 are in the mid group, disks 216, 201, 220, 212, 211, 217 and 202 are in the low group, and disks 205, 210, 209, 206, and 207 are in the lower group. Performance data are categorized along with the corresponding disk to one of the groups.

A fourth step of the method is normalizing the performance data and lifespan as a unitless performance value and a unitless lifespan value (S04). According to the present invention, the unitless performance value is calculated by dividing a first difference between a value of one performance data and the minimum value among all values of the performance data by a second difference between the maximum value and the minimum value among all values of the performance data. The unitless lifespan value is calculated by dividing a third difference between one lifespan and the minimum lifespan among all lifespans by a fourth difference between the maximum lifespan and the minimum lifespan among all lifespans. The two calculations are similar but applied to different targets. Please see FIG. 4 again. Take the normalization of lifespan as an example. In FIG. 4, the minimum lifespan among all lifespans is 56 and the maximum lifespan among all lifespans is 382. The fourth difference is 326 (382−56). For disk 216, its lifespan is 154. The third difference is 98 (154−56) and the unitless lifespan value is 0.301 (98/326).

Figure 5:
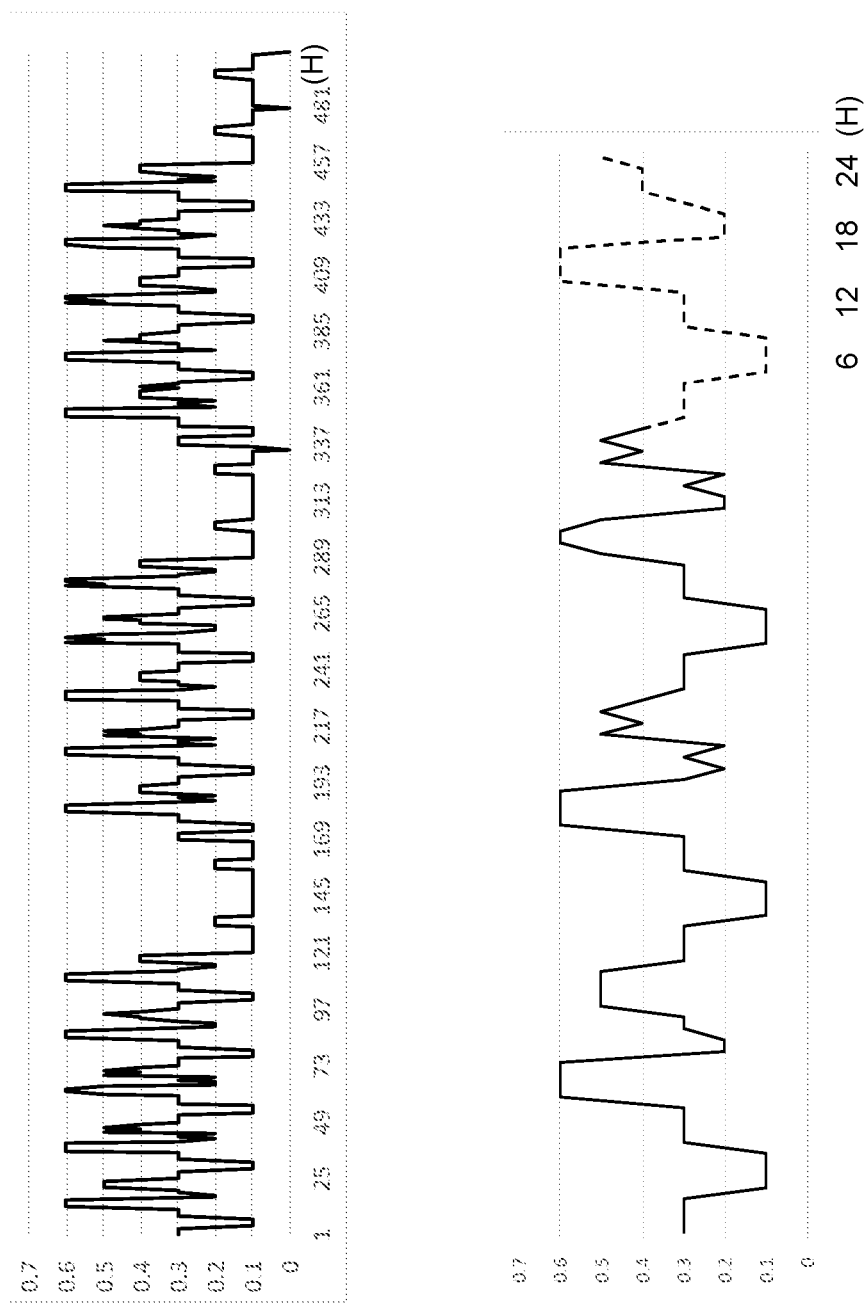
FIG. 5 shows a chart of unitless performance values collected with time in the past on the top half and a chart of a predicted trend of the unitless performance values in the 24 hours in the future on the bottom half.

Next, process LSTM modeling algorithm on the unitless performance values of each disk in each group to obtain a predicted trend of the unitless performance values in a period of time in the future for each disk (S05). LSTM modeling algorithm is a type of ANN (Artificial Neural Network). It has special designs in every node and is suitable for prediction a trend based on long-term data. Detailed design for the LSTM modeling algorithm is not the key point of the present invention. Any LSTM modeling algorithm can be applied although they may lead to results somehow different. Please see FIG. 5. It shows a chart of unitless performance values (IOPS) collected with time in the past on the top half and a chart of a predicted trend of the unitless performance values in the 24 hours in the future on the bottom half. The two charts are for the same disk, e.g. disk 208 in the high group. Each dot on the solid line in the chart on the top half is a record of IOPS of the disk 208. Interval for collecting data may be 5 mins, 10 mins, 30 mins, or an hour. It is not limited by the present invention. The dashed broken lines in the chart on the bottom half show the predicted trend of IOPS in the coming 24 hours. There are 20 disks available for analysis. There are 20 charts of predicted trend of the unitless performance values in the period of time in the future.

Figure 6:
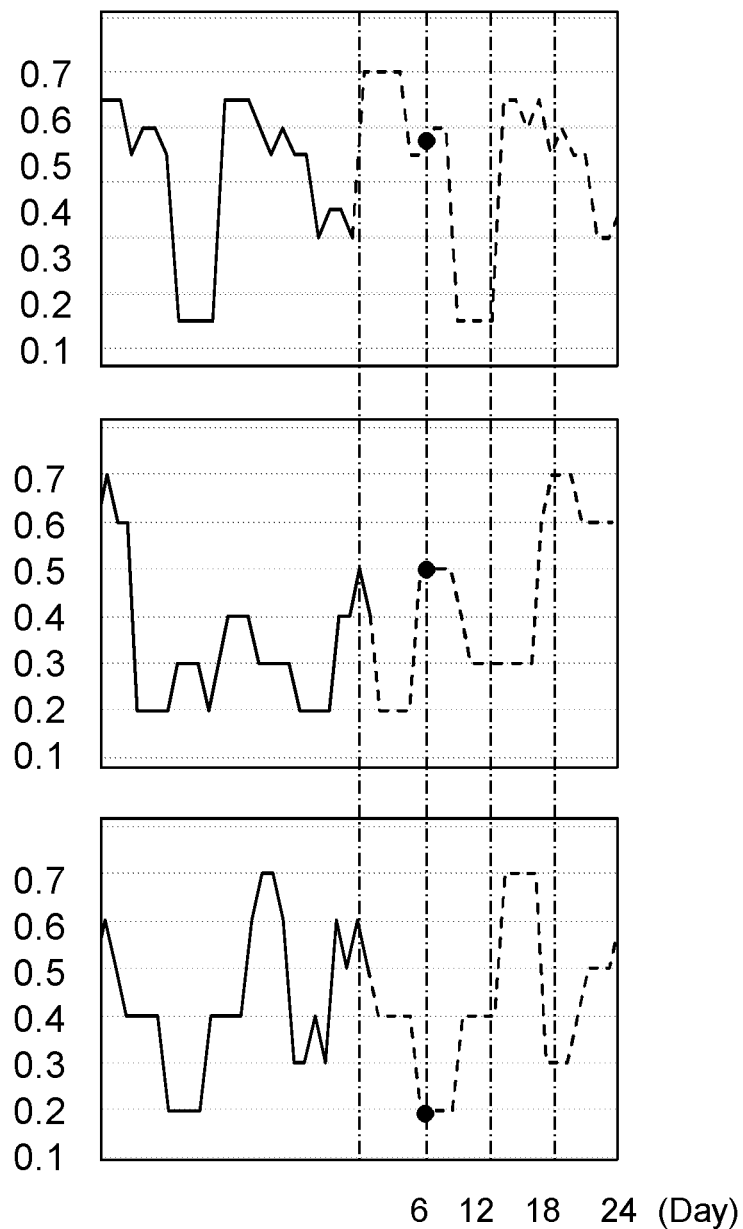
FIG. 6 shows 3 predicted trends of IOPS from the disks in a high group.

Then, assign a specific unitless performance value for all disks in each group, respectively, based on the predicted trends of the unitless performance values in the group (S06). It should be noticed that since the purpose of the present invention is to predict a life expectancy of disks in the period of time in the future and provision a best configuration of disks for different workloads to extend the lifespans for all disks, the results for the disks should be workable during "the period of time in the future". For example, the period of time in the future may refer to the coming 1 hour, the coming 6 hours, the next 6 hours after the first 6 hours, etc. Therefore, the assigned specific unitless performance value may change as the period of time in the future is defined differently. In order to have a comprehensive understanding about step S06, please refer to FIG. 6. FIG. 6 shows 3 predicted trends of IOPS from the disks in the high group. In order to find out the results for the coming 6 hours from the method, 3 predicted values from the charts (black dots), respectively, are sampled. The specific unitless performance value is obtained by averaging the predicted unitless performance values (0.58, 0.5, and 0.2) in the high group in the $6^{th}$ hour (any time in the coming 6 hours can be used). It is 0.43 as FIG. 4 shows. For the rest groups, specific unitless performance values are also given in FIG. 4. Of course, other ways, e.g. weighted average or geometric mean can be applied to find out the specific unitless performance value. It is also not restricted by the present invention.

Figure 7:
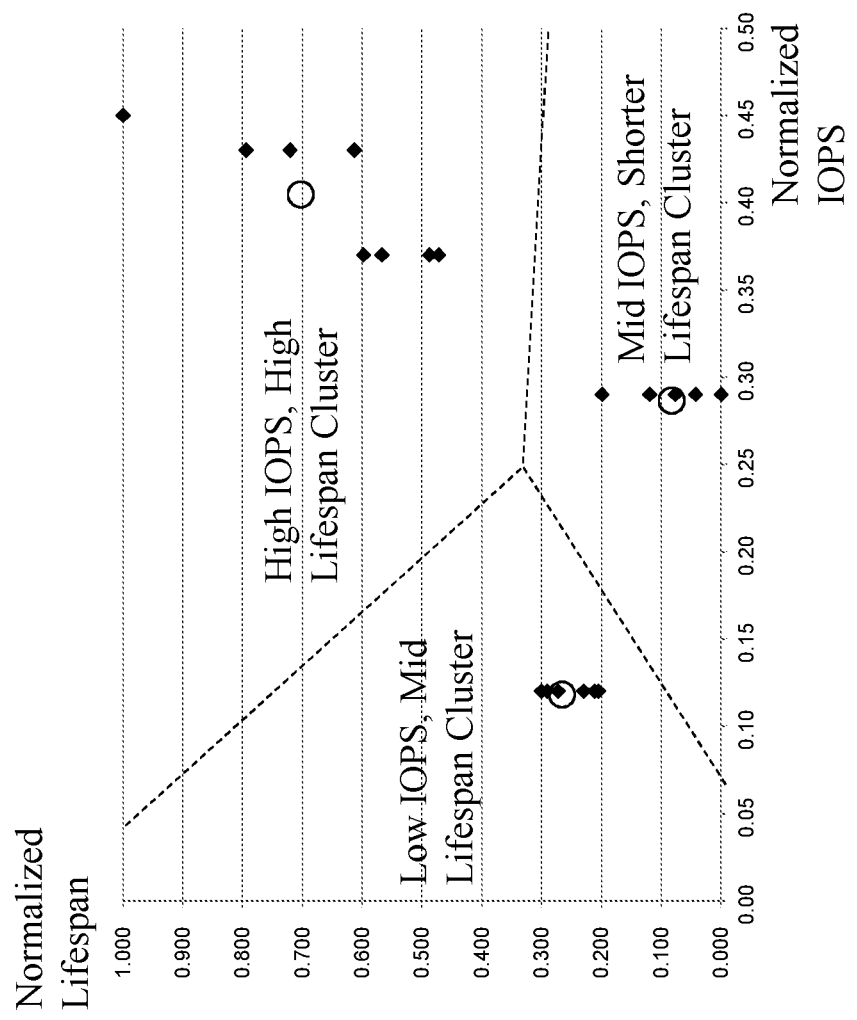
FIG. 7 provides a chart showing the distributions of input sets.

A seventh step of the method is processing k-means clustering algorithm with input sets to obtain output sets (S07). Here, each input set represents a corresponding disk and includes one specific unitless performance value and one unitless lifespan value. A chart showing the distributions of input sets is provided by FIG. 7. The horizontal axis denotes the values of specific unitless performance values (based on IOPS). The vertical axis denotes unitless lifespan values. The input sets are marked by solid diamonds. After operating, the k-means clustering algorithm may separate the input sets into 3 clusters or more (in this embodiment, 3 clusters are applied) no matter which group each input set may belong to. The central set in each cluster in step S07 can be chosen as the output set. As shown in FIG. 7, the output set of each cluster is marked by a hollow circle.

A next step is denormalizing each output set to obtain a performance limit and a target lifespan, respectively (S08). In step S08, denormalizing means multiplying the values in the output sets with the corresponding second difference and fourth difference and plus the respective minimum values to get a value of IOPS and a lifespan. For the high IOPS, high lifespan cluster, the performance limit is IOPS of 1542 and the lifespan is 284 days. For the mid IOPS, shorter lifespan cluster, the performance limit is IOPS of 1150 and the lifespan is 85 days. For the low IOPS, mid lifespan cluster, the performance limit is IOPS of 544 and the lifespan is 147 days. Then, set one performance limit to the disks forming a storage so that each disk having an expected lifetime no shorter than the target lifespan in the period of time in the future (S09). The "storage" used here is the same as "cluster". It is a number of disks linked together for a specific workload and not to confuse with the cluster in the k-means clustering algorithm. If the disks in one storage are set to have performance limit of IOPS of 1542, it means each disk in the storage has an expected lifetime of 284 days when a workload with a maximum of IOPS lower than 1542 is applied.

When all disks are set with a performance limit, the last step of the method is provisioning each storage (several disks) a workload which has a performance requirement matching or below the performance limit (S10). Under this situation, the disks can be predicted to have a minimum lifetime and the requirement of the workload (IOPS) can be satisfied. Meanwhile, the minimum lifetime is the longest life the disk can last. However, it should be emphasized that the result of step S09 is only valid for "the period of time in the future". When the definition of "the period of time in the future" changes, for example from the coming 1 hour to 6 hours, the result of step S09 changes accordingly. Arrangement of disks in the storage is dynamic.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for dynamically changing an arrangement of disks in cloud-based service system according to a workload performance requirement, comprising the steps of:

A. collecting performance data for each disk in a cloud-based service system from historical data;

B. filtering out the performance data which come from a failed disk or a disk having lifespan shorter than a default value;

C. grouping the filtered performance data according to lifespan levels;

D. normalizing the grouped performance data and lifespan corresponding to disks that have not failed or have lifespans shorter than the default value as a unitless performance value and a unitless lifespan value, respectively;

E. obtaining a predicted trend of the unitless performance values in a period of time in the future for each disk by processing LSTM (Long Short Term Memory) modeling algorithm on the unitless performance values of each disk in each group;

F. assigning a specific unitless performance value for all disks in each group, respectively, by averaging the unitless performance values of all disks in the same group at a specific time during a period of time in the future, based on the predicted trends of the unitless performance values in the group;

G. separating input sets which each represents a corresponding disk and comprises one specific unitless performance value and one unitless lifespan value into at least three clusters by k-means clustering algorithm and selecting a central set among the input sets of each cluster as an output set corresponding to the cluster;

H. denormalizing the output set of each cluster to obtain a performance limit and a target lifespan for each of the disks in the cluster;

I. forming a storage containing disks having an expected lifetime no shorter than the target lifespan in the period of time in the future according to a performance requirement of a workload, wherein arrangement of disks in the storage is dynamically changed while the period of time in the future is defined differently which causes a different specific unitless performance value to be assigned to the disks, thereby ensuring that the disks contained in the storage have performance limits higher or equal to the performance requirement of the workload in the period of time in the future.

2. The method according to claim 1, wherein the performance data is latency, throughput, CPU (Central Processing Unit) load, memory usage, or IOPS (Input/Output Per Second).

3. The method according to claim 1, wherein the unitless performance value is calculated by dividing a first difference between a value of one performance data and the minimum value among all values of the performance data by a second difference between the maximum value and the minimum value among all values of the performance data.

4. The method according to claim 1, wherein the unitless lifespan value is calculated by dividing a third difference between one lifespan and the minimum lifespan among all lifespans by a fourth difference between the maximum lifespan and the minimum lifespan among all lifespans.

5. The method according to claim 1, wherein the disk is a HDD (Hard Disk Drive) or a SSD (Solid State Disk).

6. The method according to claim 1, wherein the lifespan levels are evenly distributed over the range between the maximum lifespan and the minimum lifespan among all lifespans.

7. The method according to claim 1, wherein the historical data are from system log, application log, database log, or S.M.A.R.T. (Self-Monitoring, Analysis and Reporting Technology) log.

8. The method according to claim 1, wherein the central set in each cluster in step G is chosen as the output set.

9. A cloud-based service system, comprising:

a host, for operating workloads and processing data access;

a plurality of disks, connected to the host, for storing data to be accessed from the workloads; and a life expectancy extending module, configured to or installed in the host, for collecting performance data for each disk from historical data; filtering out the performance data which come from a failed disk or a disk having lifespan shorter than a default value; grouping the filtered performance data according to lifespan levels; normalizing the grouped performance data and lifespan corresponding to disks that have not failed or have lifespans shorter than the default value as a unitless performance value and a unitless lifespan value, respectively; obtaining a predicted trend of the unitless performance values in a period of time in the future for each disk by processing LSTM (Long Short Term Memory) modeling algorithm on the unitless performance values of each disk in each group; assigning a specific unitless performance value for all disks in each group, respectively, by averaging the unitless performance values of all disks in the same group at a specific time during the period of time in the future, based on the predicted trends of the unitless performance values in the group; separating input sets which each represents a corresponding disk and comprises one specific unitless performance value and one unitless lifespan value into at least three clusters by k-means clustering algorithm and selecting a central set among the input sets of each cluster as an output set corresponding to the cluster; denormalizing the output set of each cluster to obtain a performance limit and a target lifespan for each of the disks in the cluster; and forming a storage containing disks having an expected lifetime no shorter than the target lifespan in the period of time in the future according to a performance requirement of a workload, wherein arrangement of disks in the storage is dynamically changed while the period of time in the future is defined differently which causes a different specific unitless performance value to be assigned to the disks, thereby ensuring that the disks contained in the storage have performance limits higher or equal to the performance requirement of the workload in the period of time in the future.

10. The cloud-based service system according to claim 9, wherein the performance data is latency, throughput, CPU (Central Processing Unit) load, memory usage, or IOPS (Input/Output Per Second).

11. The cloud-based service system according to claim 9, wherein the unitless performance value is calculated by dividing a first difference between a value of one performance data and the minimum value among all values of the performance data by a second difference between the maximum value and the minimum value among all values of the performance data.

12. The cloud-based service system according to claim 9, wherein the unitless lifespan value is calculated by dividing a third difference between one lifespan and the minimum lifespan among all lifespans by a fourth difference between the maximum lifespan and the minimum lifespan among all lifespans.

13. The cloud-based service system according to claim 9, wherein the disk is a HDD (Hard Disk Drive) or a SSD (Solid State Disk).

14. The cloud-based service system according to claim 9, wherein the lifespan levels are evenly distributed over the range between the maximum lifespan and the minimum lifespan among all lifespans.

15. The cloud-based service system according to claim 9, wherein the historical data are from system log, application log, database log, or S.M.A.R.T. (Self- Monitoring, Analysis and Reporting Technology) log.

16. The cloud-based service system according to claim 9, wherein the central set in each cluster from the k-means clustering is chosen as the output set.

* * * * *